US011198239B2

(12) United States Patent
Tooman et al.

(10) Patent No.: US 11,198,239 B2
(45) Date of Patent: Dec. 14, 2021

(54) HEATER BAND FOR HOT RUNNER INJECTION MOLDING SYSTEMS

(71) Applicant: Plastic Engineering & Technical Services, Inc., Auburn Hills, MI (US)

(72) Inventors: Patrick A. Tooman, Clarkston, MI (US); Bruce Casey, White Lake, MI (US)

(73) Assignee: Plastic Engineering & Technical Services, Inc., Auburn Hills, MI (US)

( * ) Notice: Subject to any disclaimer, the term of this patent is extended or adjusted under 35 U.S.C. 154(b) by 427 days.

(21) Appl. No.: 15/927,547

(22) Filed: Mar. 21, 2018

(65) Prior Publication Data

US 2019/0291319 A1 Sep. 26, 2019

(51) Int. Cl.
*B29C 45/27* (2006.01)
*B29C 45/03* (2006.01)

(52) U.S. Cl.
CPC .......... *B29C 45/2737* (2013.01); *B29C 45/03* (2013.01); *B29C 2045/2748* (2013.01)

(58) Field of Classification Search
CPC ............ B29C 2045/2748; B29C 45/03; B29C 45/2737
USPC ................ 219/209, 542, 544; 392/473, 407; 425/563, 572, 110; 264/328.15, 272.15; 374/147, 208, E01.018
See application file for complete search history.

(56) References Cited

U.S. PATENT DOCUMENTS

| 3,812,323 | A | * | 5/1974 | Pink | B29C 45/2737 219/535 |
| 3,849,630 | A | * | 11/1974 | Halliday | B29C 45/2737 219/535 |
| 5,411,392 | A | * | 5/1995 | Von Buren | B29C 45/1782 264/328.15 |
| 5,928,549 | A | * | 7/1999 | Hitzigrath | H05B 3/24 219/548 |
| 6,305,923 | B1 | * | 10/2001 | Godwin | B29C 45/2711 425/143 |
| 2003/0003188 | A1 | * | 1/2003 | Gunther | B29C 45/2756 425/549 |
| 2006/0151475 | A1 | * | 7/2006 | Horvath | F24D 13/022 219/529 |

(Continued)

*Primary Examiner* — Tu B Hoang
*Assistant Examiner* — Vy T Nguyen
(74) *Attorney, Agent, or Firm* — Warner Norcross + Judd LLP

(57) ABSTRACT

An improved heater band for a hot runner injection molding machine. The heater band includes a cylindrical sleeve adapted to be disposed about a nozzle body in combination with a first wire heating element and a second wire heating element. The first wire heating element includes two contact terminals and an intermediate portion therebetween. The intermediate portion of the first wire heating element is disposed within the cylindrical sleeve. The second wire heating element includes two contact terminals and an intermediate portion therebetween. The intermediate portion of the second wire heating element is also disposed within the cylindrical sleeve. The intermediate portions of the heating elements are adjacent to and axially offset from one another within the cylindrical sleeve. The first wire heating element and the second wire heating element can be alternatively connected to an electrical power supply to extend the operational life of the heater band.

8 Claims, 4 Drawing Sheets

(56) References Cited

U.S. PATENT DOCUMENTS

| | | | |
|---|---|---|---|
| 2010/0091814 A1* | 4/2010 | Kuntz | B29C 45/1782 |
| | | | 374/147 |
| 2013/0087944 A1* | 4/2013 | Samejima | B29C 45/14639 |
| | | | 264/272.15 |
| 2015/0219264 A1* | 8/2015 | Tailor | B32B 37/142 |
| | | | 156/86 |

* cited by examiner

HEATER BAND FOR HOT RUNNER INJECTION MOLDING SYSTEMS

FIELD OF THE INVENTION

The present invention relates to removable nozzle heater bands for hot runner injection molding systems.

BACKGROUND OF THE INVENTION

Injection molding includes the transfer of a molten material into a mold, typically at high pressures. Plastic injection molding is one such process, in which an injection unit melts pelletized plastic into molten plastic before injecting the molten plastic into a closed mold. In its most basic configuration, the mold includes two halves, a core half and a cavity half, which cooperate to define a mold cavity in the desired shape of a single article. The molten plastic cools and solidifies between the mold halves, and is ejected from the mold cavity as a finished article.

Heat generation is an important aspect of the plastic injection molding process. In hot runner systems, the nozzle barrel is typically surrounded by electrically-powered heater bands. These heater bands provide heat transfer through the nozzle barrel to the molten plastic. More specifically, heater bands are known to convert 240V AC into temperatures of up to 1200° C. However, heater band replacement requires substantial downtime of the injection molding machine. For example, the replacement of a heater band can require the removal of the cavity plate from the core plate, during which the injection molding machine is inoperable.

Accordingly, there remains a continued need for a removable heater band having an extended useful life to minimize the downtime for injection molding systems while still providing efficient heat transfer to the nozzle barrel of hot runner systems.

SUMMARY OF THE INVENTION

An improved heater band for a hot runner injection molding system is provided. In one embodiment, the band includes a cylindrical sleeve adapted to be disposed about a nozzle body in combination with a first wire heating element and a second wire heating element. The first wire heating element has a first contact terminal, a second contact terminal, and an intermediate portion therebetween. The intermediate portion of the first wire heating element is disposed in an interior portion of the cylindrical sleeve. The second wire heating element has a first contact terminal, a second contact terminal, and an intermediate portion therebetween. The intermediate portion of the second wire heating element is disposed in the interior portion of the cylindrical sleeve. The intermediate portion of the first wire heating element is adjacent to and axially offset from the intermediate portion of the second sire heating element. The first wire heating element and the second wire heating element can be alternatively connected to an electrical power supply to extend the operational life of the heater band to substantially reduce maintenance costs and equipment down time.

In another embodiment, the heater band is part of an injection molding system including a mold defining a mold cavity, a nozzle body for delivering molten plastic thereto, and a heater band on the nozzle body for heating the molten plastic. The heater band includes a cylindrical sleeve disposed about the body of the nozzle. The sleeve includes a first wire heating element and a second wire heating element. Each wire heating element has a first contact terminal and a second contact terminal as well as an intermediate portion between the terminals. The intermediate portions of the wire heating elements are adjacent to and axially offset from one another within the cylindrical sleeve. The wire heating elements can be alternatively connected to an electrical power supply to extend the operational life of the band.

In still another embodiment, the heater band is provided for a hot runner injection molding system. The heater band includes a cylindrical sleeve and two heating elements. The cylindrical sleeve includes a first cylindrical surface opposite a second cylindrical surface to define an interior volume therebetween. A first and a second wire heating element are disposed within the interior volume of the cylindrical sleeve. Each wire heating element has a first contact terminal, a second contact terminal, and an intermediate portion. The intermediate portions of the wire heating elements are each adjacent to and axially offset from each other. As with the above embodiments, the first and second wire heating elements can be alternatively connected to an electrical power supply to extend the operational life of the heater band.

These and other features and advantages of the present invention will become apparent from the following description of the invention, when viewed in accordance with the accompanying drawings and appended claims.

DETAILED DESCRIPTION OF THE CURRENT EMBODIMENTS

Figure 1:
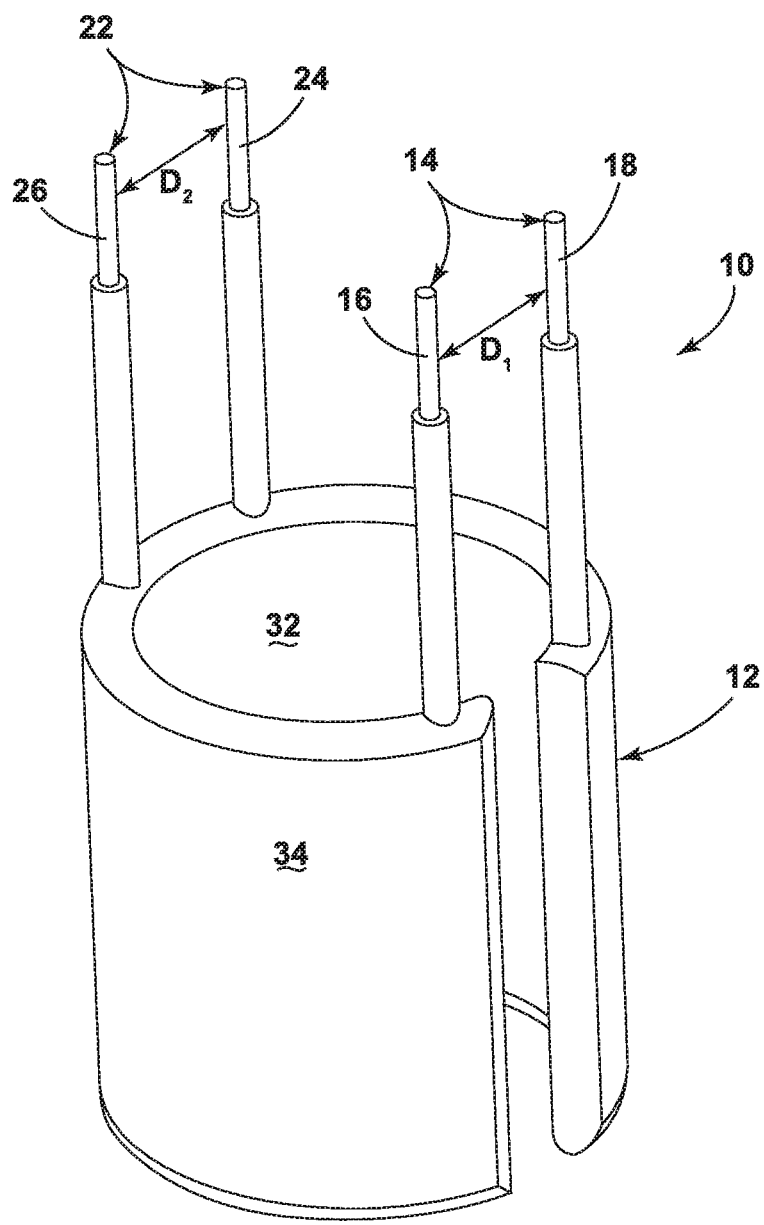
FIG. 1 is a perspective view of a heater band in accordance with one embodiment.
Figure 2:
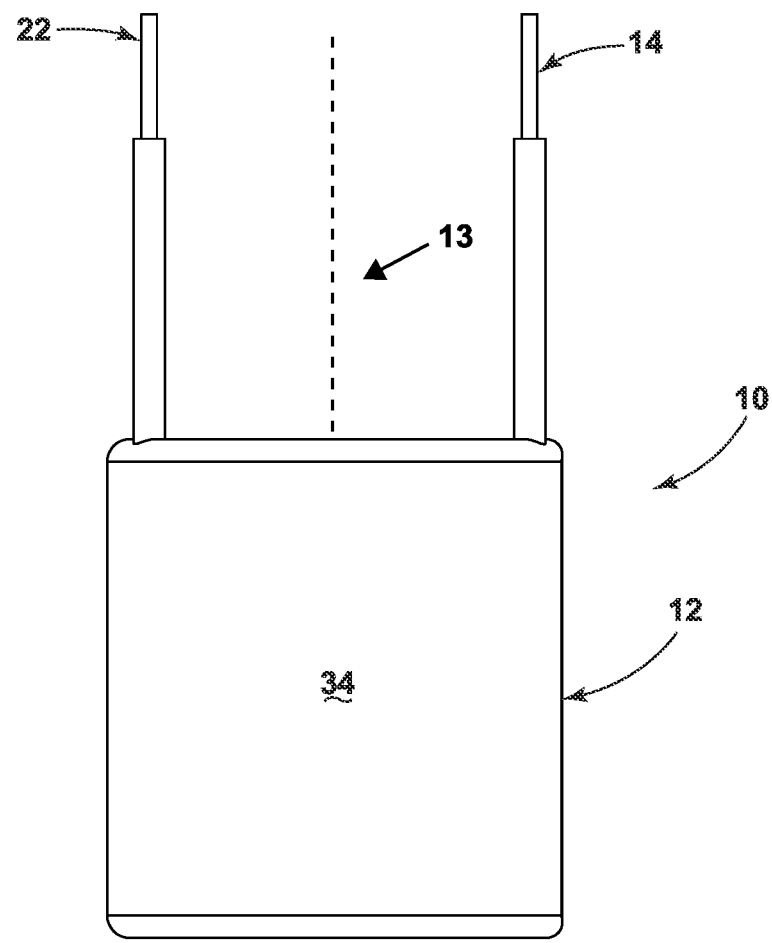
FIG. 2 is a side elevation view of the heater band of FIG. 1.
Figure 3:
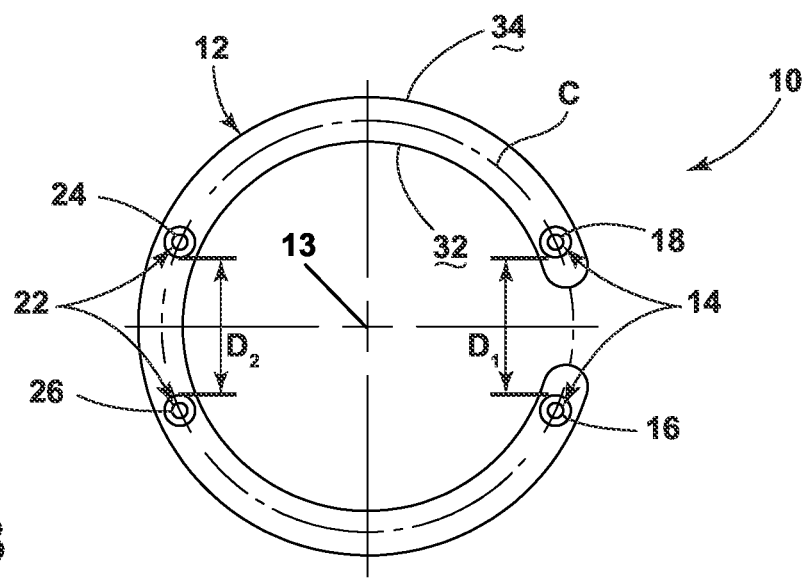
FIG. 3 is a top plan view of the heater band of FIG. 1.

The invention as contemplated and disclosed herein includes a heater band for a hot runner injection molding system. The heater band includes a cylindrical sleeve and two or more wire heating elements disposed within the cylindrical sleeve and electrically isolated from each other. The wire heating elements can be alternatively connected to an electrical power supply to extend the operational life of the heater band. A description of the heater band is set forth in Part I below, and a description of an injection molding machine including the heater band follows in Part II below.

I. Heater Band

Referring to FIGS. 1-5, wherein like numerals indicate corresponding parts through the several views, a heater band is illustrated and generally designated 10. The heater band 10 includes a cylindrical sleeve 12 adapted to be disposed about a nozzle body. The cylindrical sleeve 12 defines a longitudinal centerline axis 13. The cylindrical sleeve 12 includes a first cylindrical surface 32 opposite a second cylindrical surface 34 to define an interior volume therebetween. Within this interior volume are disposed a first wire heating element 14 and a second wire heating element 22. The cylindrical sleeve 12 may be manufactured of a variety of materials suitable to its purpose, optionally metal, most further optionally spring steel. The sleeve 12 may optionally include an insulated outer layer.

The first wire heating element 14 has a first contact terminal 16, a second contact terminal 18, and an intermediate portion 20 therebetween. The intermediate portion 20 of the first wire heating element 14 is disposed in an interior portion of the cylindrical sleeve 12. The second heating element 22 has a first contact terminal 24, a second contact terminal 26, and an intermediate portion therebetween 28. The intermediate portion 28 of the second wire heating element 22 is disposed in the interior portion of the cylindrical sleeve 12. The first wire heating element 14 is electrically isolated from the second wire heating element 22 within the cylindrical sleeve 12.

Figure 4:
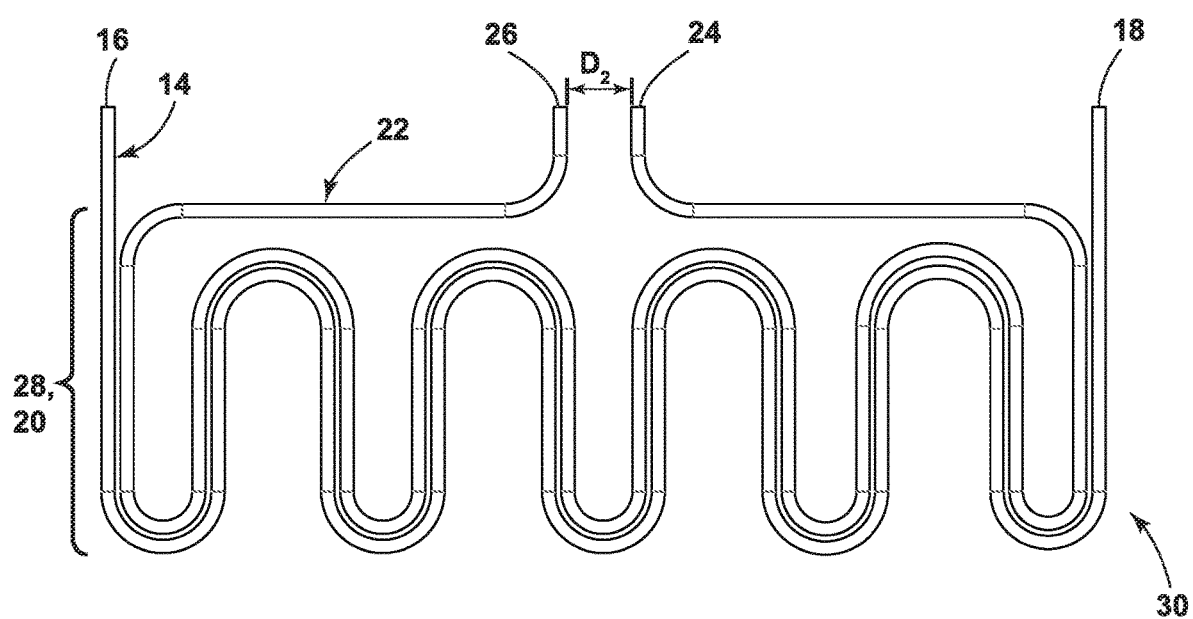
FIG. 4 is a side view of the heater coils in in the heater band of FIG. 1.
Figure 5:
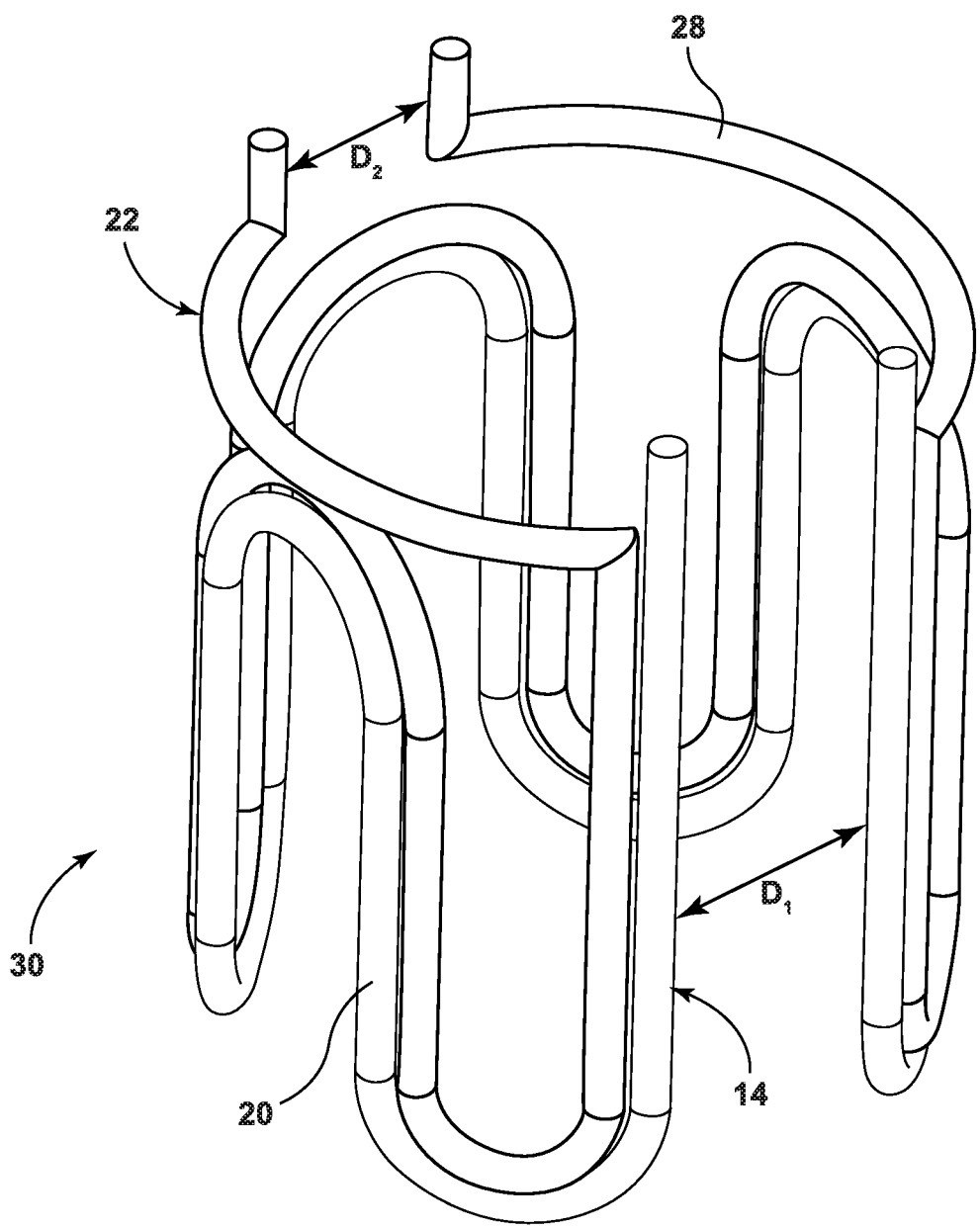
FIG. 5 is a perspective view of the heater coils in in the heater band of FIG. 1.

The intermediate portion of the first wire heating element 20 is adjacent to and axially offset from the intermediate portion of the second wire heating element 28, as best shown in FIGS. 4 and 5, to form a serpentine pattern 30. It is to be understood that it is keeping with the spirit of the invention to arrange the intermediate portions of the wire heating elements 20 30 in other than a serpentine pattern, such as a zig-zag pattern or various other patterns. It is to be further understood that the particular embodiment of a serpentine pattern 30 shown in the figures is not intended to be limiting and it is within the spirit of the invention to use various forms of a serpentine pattern 30; for example, with more or fewer turns. The first wire heating element 14 and the second wire heating element 22 are disposed in a serpentine pattern 30 about the circumference of the cylindrical sleeve C. The first wire heating element 14 and the second wire heating element 22 can be alternatively connected to an electrical power supply to extend the operational life of the heater band 10. Various wire heating elements may be used in the heating band 10, optionally a resistive heating element or a coiled heating element. To facilitate use of the same power supply alternatively with each of the two wire heating elements 14, 22, the first and second contact terminals of the first wire heating element 16, 18 are spaced apart from each other by a distance $D_1$ that is equal to the distance $D_2$ separating the first and second contact terminals of the second wire heating element 24, 26.

II. Injection Molding Machine

The heating band 10 can be used as part of an injecting molding machine. The machine can include a mold defining a mold cavity, a nozzle body for delivering molten plastic to the mold cavity, and either a single or a plurality of the heater band 10 described above. The heater band 10 is disposed around the nozzle body for heating the molten plastic therein. The temperature of the heater band may be controlled using techniques known in the art as process conditions demand.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A heater band comprising:
a cylindrical sleeve defining a longitudinal centerline axis;
a first wire heating element having a first contact terminal, a second contact terminal, and an intermediate portion therebetween, the first contact terminal and the second contact terminal being separated from each other by a first fixed distance and protruding from an axial end-portion of the cylindrical sleeve, the intermediate portion of the first wire heating element being disposed in a first serpentine pattern within an interior portion of the cylindrical sleeve such that the intermediate portion of the first wire heating element repeatedly doubles back on itself about the circumference of the cylindrical sleeve and includes spaced apart vertical portions that are parallel to the longitudinal centerline axis of the cylindrical sleeve, wherein adjacent ones of the spaced apart vertical portions of the first wire heating element are connected to each other via an upwardly curved portion or a downwardly curved portion spanning 180 degrees; and
a second wire heating element having a first contact terminal, a second contact terminal, and an intermediate portion therebetween, the first contact terminal and the second contact terminal being separated from each other by a second fixed distance and protruding from the axial end-portion of the cylindrical sleeve, the intermediate portion of the second wire heating element being disposed in a second serpentine pattern within the interior portion of the cylindrical sleeve such that the intermediate portion of the second wire heating element repeatedly doubles back on itself about the circumference of the cylindrical sleeve and includes spaced apart vertical portions that are parallel to the longitudinal centerline axis of the cylindrical sleeve, wherein adjacent ones of the spaced apart vertical portions of the second wire heating element each other via an upwardly curved portion or a downwardly curved portion spanning 180 degrees;
wherein the intermediate portion of the first wire heating element is adjacent to and axially offset from the intermediate portion of the second wire heating element, and wherein the first fixed distance being equal to the second fixed distance such that the first and second contact terminals of the first wire heating element and the first and second contact terminals of the second wire heating element can be alternatively connected to an electrical power supply to extend the operational life of the heater band.

2. The heater band of claim 1 wherein the first wire heating element and the second wire heating element are resistive heating elements.

3. The heater band of claim 1 wherein the first wire heating element and the second wire heating element are coiled heating elements.

4. The heater band of claim 1 wherein the cylindrical sleeve is formed from spring steel.

5. A heater band comprising:
a cylindrical sleeve defining a longitudinal centerline axis and including a first cylindrical surface opposite a second cylindrical surface to define an interior volume therebetween; and
first and second wire heating elements disposed within the interior volume of the cylindrical sleeve in a serpentine pattern about the circumference of the cylindrical sleeve, the serpentine pattern of each of the wire heating elements repeatedly doubling back on itself about the circumference of the cylindrical sleeve, such that the intermediate portion of the first and second wire heating elements includes spaced apart vertical portions that are parallel to the longitudinal centerline axis of the cylindrical sleeve, wherein adjacent ones of the spaced apart vertical portions of the first wire heating element are connected to each other via an upwardly curved portion or a downwardly curved portion spanning 180 degrees, and wherein adjacent ones of the spaced apart vertical portions of the second wire heating element each other via an upwardly curved portion or a downwardly curved portion spanning 180 degrees, each of the first wire heating element and the second wire heating element having a first contact terminal, a second contact terminal, and an intermediate portion, wherein the first contact terminal and the second contact terminal of the first wire heating element are separated from each other by a first fixed distance at an axial end portion of the cylindrical sleeve and the first contact terminal and the second contact terminal of the second wire heating element are separated from each other by a second fixed distance equal to the first fixed distance at the axial end portion of the cylindrical sleeve, and wherein the intermediate portion of the first wire heating element is adjacent to and axially offset from the intermediate portion of the second wire heating element, and wherein the first and second contact terminals of the first wire heating element and the first and second contact terminals of the second wire heating element can be alternatively connected to an electrical power supply to extend the operational life of the heater band.

6. The heater band of claim 5 wherein the first wire heating element and the second wire heating element are resistive heating elements.

7. The heater band of claim 5 wherein the first wire heating element and the second wire heating element are coiled heating elements.

8. The heater band of claim 5 wherein the cylindrical sleeve is formed from spring steel.

* * * * *